Feb. 21, 1950 C. E. KILGOUR 2,498,210

PIEZOELECTRIC PHONOGRAPH PICKUP DEVICE

Filed Nov. 2, 1948 4 Sheets-Sheet 1

INVENTOR.
CHARLES E. KILGOUR.

BY

Alden D. Redfield,
ATTY.

Feb. 21, 1950 C. E. KILGOUR 2,498,210

PIEZOELECTRIC PHONOGRAPH PICKUP DEVICE

Filed Nov. 2, 1948 4 Sheets-Sheet 2

INVENTOR.
CHARLES E. KILGOUR.
BY
Alden D. Redfield,
ATTY.

Feb. 21, 1950 C. E. KILGOUR 2,498,210

PIEZOELECTRIC PHONOGRAPH PICKUP DEVICE

Filed Nov. 2, 1948 4 Sheets-Sheet 3

INVENTOR.
CHARLES E. KILGOUR.

BY

Alden D. Redfield.
ATTY.

PIEZOELECTRIC PHONOGRAPH PICKUP DEVICE

Filed Nov. 2, 1948 4 Sheets-Sheet 4

INVENTOR.
CHARLES E. KILGOUR.
BY
Alden D. Redfield.
ATTY.

Patented Feb. 21, 1950 2,498,210

UNITED STATES PATENT OFFICE 2,498,210

PIEZOELECTRIC PHONOGRAPH PICKUP DEVICE

Charles E. Kilgour, Cincinnati, Ohio, assignor to Avco Manufacturing Corporation, Cincinnati, Ohio, a corporation of Delaware Application November 2, 1948, Serial No. 57,963

2 Claims. (Cl. 179—100.41)

Figure 1:
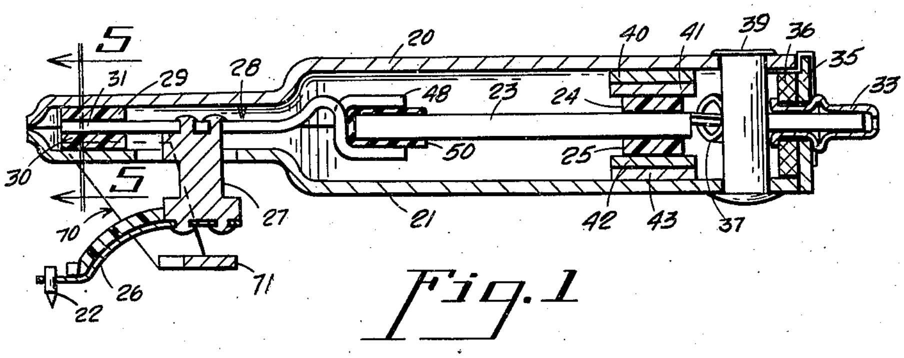

The present invention relates generally to an electric generator device in which the energy-producing means consists of a piezoelectric unit, and the invention relates specifically to a crystal phonograph pickup in which the piezoelectric unit is of the type which flexes in torsion.

It is well known that the structural arrangement of crystal pickups is deliberately so designed that a considerable amount of motion is lost in the mechanical coupling between the vibrating stylus and the crystal. Provisions for introducing lost motion are purposely made in order to prevent crystal breakage. These provisions generally consist in essence of elastance parameters. Such elastance parameters may include resilient crystal clamping means at the rear of the casing and resilient acoustic damping pads or the like for coupling the crystal to a shaft or tongue which transmits motion from the stylus to the crystal. One of the directive concepts of the present invention is the introduction of an elastance parameter in the plane of the crystal, whereby the crystal portion nearest the stylus has a high degree of lateral freedom with respect to the mounting for the motion-transmitting means located between the stylus and the crystal. The construction in accordance with the invention differs from the prior art primarily in that only a single supporting means at the front of the casing is employed for mounting the motion-transmitting means or coupler, the latter being mounted as a cantilever. The junction of the cantilever and the crystal has a considerable freedom for lateral motion (i. e., motion in a generally horizontal plane through the longitudinal axis of the motion-transmitting coupler and crystal). It will be appreciated that a small degree of freedom at the front end of the coupler, where the coupler is mounted in elastic pads, will result in a large degree of freedom at the junction of the crystal and the coupler. In the case of mechanical systems employing moving masses, the introduction of elastance parameters creates mechanical resonances, equivalent to electric circuit resonances. The provision of this lateral compliance introduces an additional mechanical "circuit" into the system, which is advantageous in shaping its overall response in accordance with the characteristics shown in Fig. 6.

A primary object of the invention is the provision of a novel mounting for supporting as a cantilever the coupler which transmits vibrations from the stylus to the piezoelectric unit, this mounting acting in such a manner as to permit not only turning movement of the motion-transmitting coupler, but also lateral movement, in the plane of the crystal, of the junction of coupler and crystal, whereby the middle frequency vibrations are accentuated and discrimination against noise is increased.

Another basic object of the invention is to provide an improved phonograph pickup in which the motion translating coupler is so mounted as to effect a power output vs. frequency characteristic, when standard record discs are employed, which remains substantially flat with rising frequency until a range of 2000 cycles per second or so is attained, whereupon the characteristic sharply falls and strongly discriminates against noise, most of which occurs at a higher frequency range.

Commercial records are commonly recorded with constant amplitude from low frequencies up to frequencies of 500 to 800 cycles per second, the trend of late being toward the latter figure. From this point, known as the turnover, the amplitude is made to fall at a rate inversely proportional to frequency.

It has been found that in order to produce an effect of brilliance and fidelity the reproducing equipment must compensate for this falling characteristic above the turnover point. However, with commonly used shellac records, scratch noise becomes objectionable if this compensation is carried to frequencies much above 2000 cycles per second. Accordingly, it has been found that an effect, of great brilliance without scratch is secured by compensation up to about 2000 cycles followed by a very sharp cut-off in the frequency characteristic. This compensation and cut-off may be secured in the pickup by the use of mechanical circuits very much more economically than by the use of electrical circuits in the following amplifier. In the present invention the freedom for lateral motion of the junction of the crystal 23 and the motion-transmitting coupler 28 of Fig. 1, together with the compliance of the spring 26 are largely instrumental in securing the desired effect. This freedom for lateral motion introduces an extra controllable "circuit" in the mechanical system which is not present in conventional pickups in which the motion-transmitting member is trunnioned in two bearings.

A further primary object of the present invention is to provide the combination of a mechanical coupling, between the stylus and the crystal unit, and a mounting for the coupling which eliminates the use of rubber bearings and trunnions. In prior art devices such as that shown in Fig. 4 of Dally Patent No. 2,187,772, the mechanism for transferring motion from the stylus to the crystal unit includes trunnions and bearings or rubber bearing sleeves or the equivalents. These trunnions are located on both sides of a stylus arm or other mechanical expedient for securing the stylus to a shaft or the like. Such arrangements are designed to permit turning movement only of the shaft relative to its own longitudinal axis. These bearings are often of short service life, and they are regarded as a common cause of failure. The invention provides a cantilever arrangement whereby any bearings or trunnions or like devices between the stylus arm or equivalent and the crystal clamp are dispensed with.

In accordance with the invention there is provided, in a phonograph pickup of the type including a casing, a stylus, and a torsional type piezoelectric unit supported in the rear of the casing remote from the stylus, the combination of a coupler secured to the stylus for transmitting motion from the stylus to the piezoelectric unit in conformity to the vibrations of the stylus on a sound record disc, and means for supporting said coupler as a cantilever.

Other and further objects, capabilities, and advantages of the invention will be made apparent from the following detailed description, the claims appended hereto, and the drawings, in which there are illustrated three illustrative embodiments of the present invention.

Figure 2:
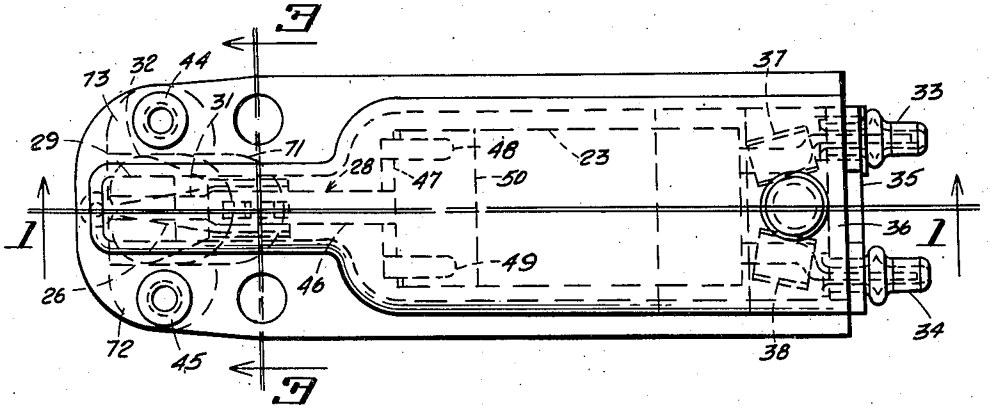
Figure 4:
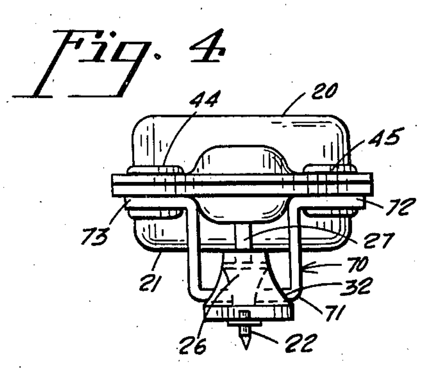
Figure 3:
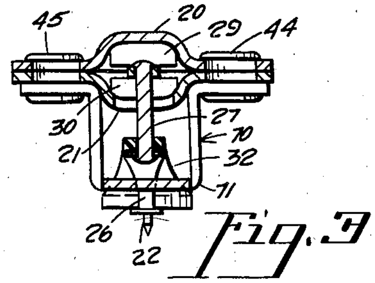
Figure 5:
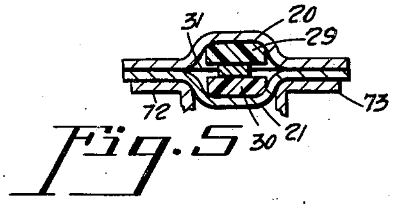
Figure 6:
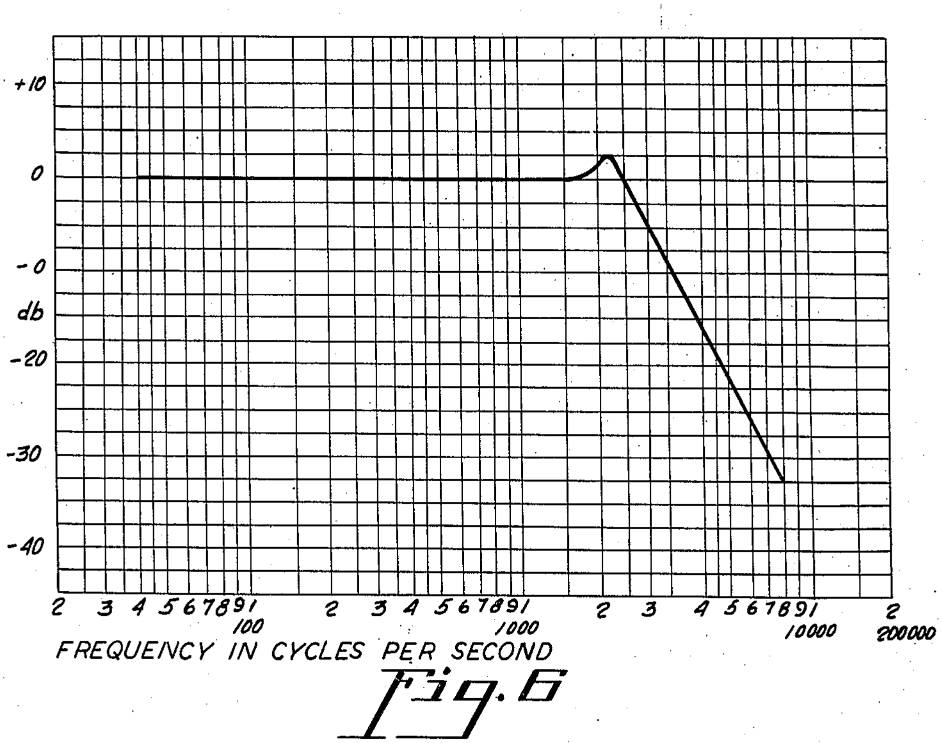
Figures 7, 8, 10:
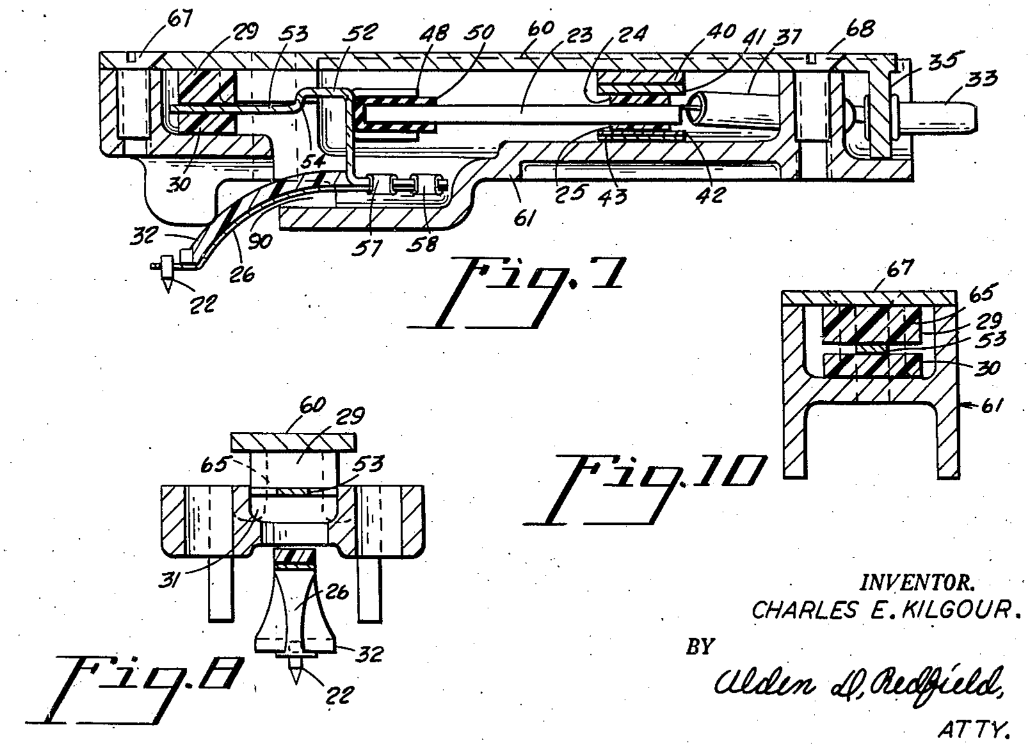
Figure 9:
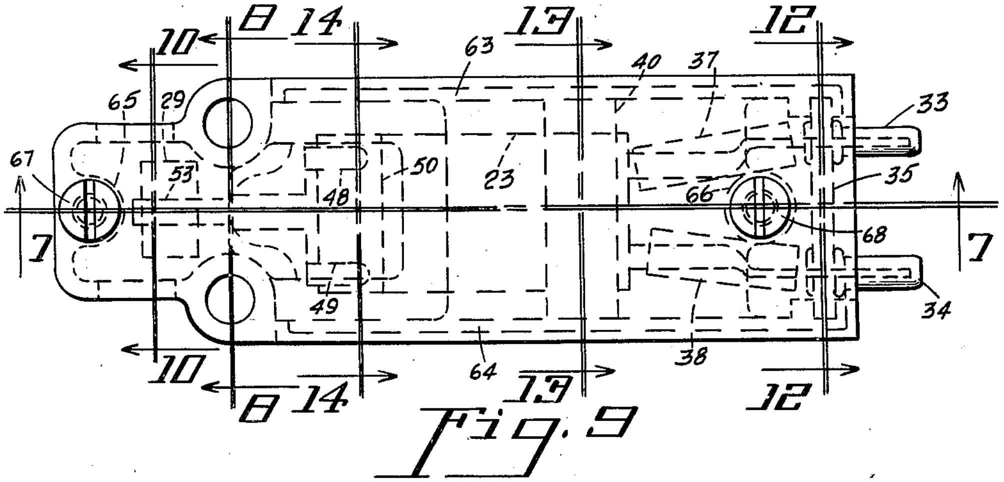
Figure 11:
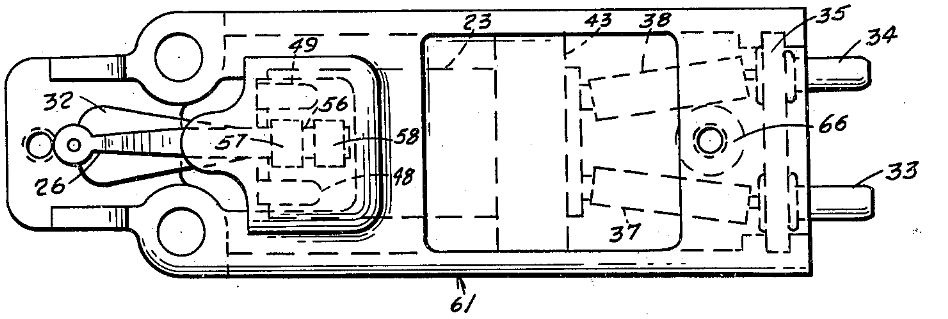
Figure 12:
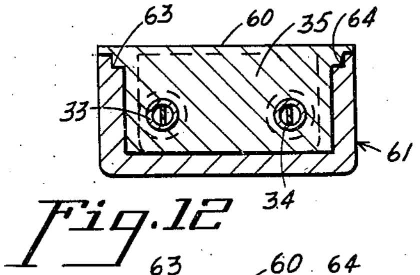
Figure 13:
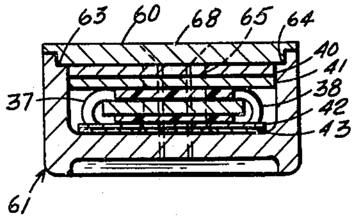
Figure 14:
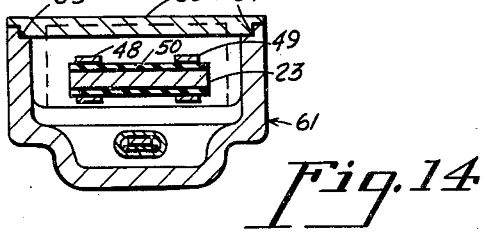
Figure 15:
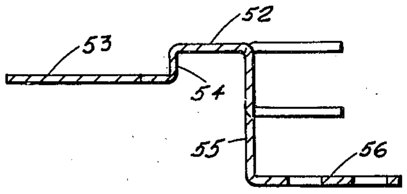
Figure 16:
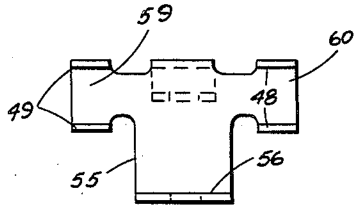
Figure 17:
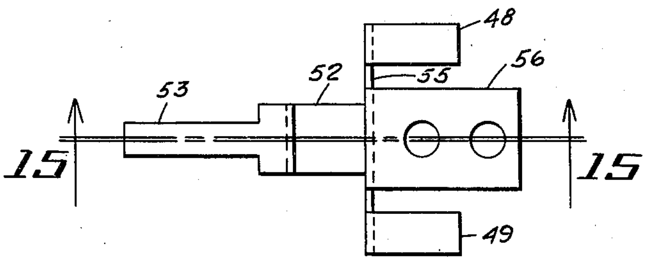
Figure 18:
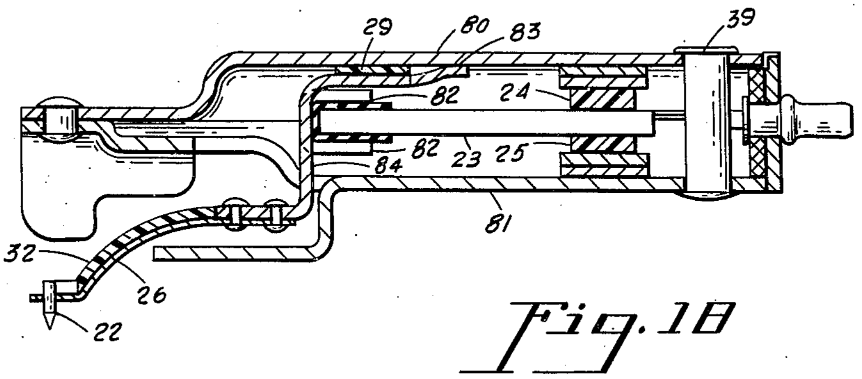

In the drawings:

Fig. 1 is a sectional view of a preferred embodiment of crystal phonograph pickup in accordance with the present invention, taken on line 1—1 of Fig. 2, looking in the direction of the arrows; Fig. 2 is a top plan view of the preferred form of pickup; Fig. 3 is a sectional view taken on line 3—3 of Fig. 2; Fig. 4 is a left end view of the Fig. 1 pickup; Fig. 5 is a sectional view taken on line 5—5 of Fig. 1; Fig. 6 is a curve showing the output vs. frequency performance characteristic of the Fig. 1 embodiment; Fig. 7 is a cross-sectional view of a modified form of the invention, taken on line 7—7 of Fig. 9; Figs. 8, 10, 12, 13, and 14 are cross-sectional views taken on lines 8—8, 10—10, 12—12, 13—13, and 14—14 of Fig. 9; Fig. 9 is a top plan view of the Fig. 7 embodiment, and Fig. 11 is a bottom view thereof; Fig. 15 is a cross-sectional view of the coupler member illustrated in Fig. 7, taken on line 15—15 of Fig. 17; Figs. 16 and 17 are right end and top plan views of that coupler member; and Fig. 18 is a cross-sectional view of another embodiment of the invention in which the tongue member is secured to the top of the case.

Referring now specifically to the preferred embodiment illustrated in Figs. 1, 2, 3, and 4 of the drawings, there is shown a phonograph pickup of the type including a case comprising an upper aluminum member 20 and a lower aluminum member 21, a stylus 22, and a torsion-type piezoelectric unit 23 supported by soft rubber pads 24 and 25 in the rear of the casing remote from the stylus. This pickup includes means comprising a spring or stylus holder 26 affixed, as by rivets, to a stud 27, in turn secured, as by rivets, to a stiff metallic tongue or coupler 28, for transmitting motion from the stylus 22 to the piezoelectric crystal unit 23 in conformity to the vibrations of the stylus as it tracks a laterally cut sound disc record. The novel combination in accordance with the invention not only comprises the motion-transmitting means 26, 27, 28, but also means comprising clamping pads 29 and 30 of acoustic damping material disposed in front of the casing 20, 21 for gripping the forwardly extending arm 31 of the coupler 28 and supporting the coupler as a cantilever in such a manner as to permit not only turning movement of the coupler relative to its longitudinal axis, but also restrained lateral movement of the junction of the motion-transmitting coupler and the crystal, whereby certain objects of this invention are achieved: accentuation of the high frequency vibrations in the 2000 cycle range, and discrimination against noise frequency components above that range.

The stylus 22, the spring 26, and the flared damper 32 (Fig. 2) for the spring 26 are fully disclosed and described in my co-pending application, Serial No. 659,215, filed in the United States Patent Office on April 3, 1946, entitled "Sound reproduction" and assigned to the same assignee as the present invention and application. Reference is made to that co-pending application for a detailed description of the elements 22, 26, and 32. It will be understood that, so far as the present invention is concerned, any suitable stylus and spring holder may be substituted for those specific elements.

Piezoelectric units of the kind designated by the reference numeral 23 are commonly made of Rochelle salt crystalline material and are well-known to those skilled in this art. The unit 23 is of a multiple plate type which flexes torsionally in accordance with the laterally cut track of a sound disc record. It is trapezoidal in outline and comprises a pair of crystal plates firmly cemented together, each plate having a thin electrode attached to each of its faces. The two inner electrode faces are conventionally connected to one terminal, and the two outer electrode faces are connected to another terminal. Such conventional terminals are designated by the reference numerals 33 and 34, mounted on a mica terminal board 35 adjacent the rear end housing seal 36. The conductors from the crystal faces to the terminals may in conventional manner be brought through plastic tubing sections 37 and 38.

The casing sections are securely clamped together by a rivet 39. The crystal unit is securely clamped at the rear of the casing by soft rubber pads 24 and 25, which in turn are secured in place within the casing by metallic fillers 40, 41, 42, and 43.

A loop-shaped guard 70 having the usual rearwardly extending offset 71 is secured to the lower casing member 21 by its integral ears 72, 73 and by eyelets 44 and 45.

Coming now to the specific description of the means 26, 27, and 28 for transmitting motion from the stylus to the piezoelectric unit, it will be noted that this means has in general a T-shaped configuration. The stylus 22 may be regarded as secured to the leg of the T. The rear arm of the T is clamped to the crystal 23, and the forwardly extending arm 31 is secured between pads 29 and 30. These pads support tongue or coupler 28 as a cantilever, and they act as the sole support for the tongue and the depending stud and stylus. These pads are in turn securely clamped between the casing members 20, 21, which form an interior which is enlarged at its center and rear portions to provide for the crystal mounting and contracted at its front portion to secure the assembly of members 29, 28, and 30 in place. The coupler 28 is formed not only with the relatively flat forwardly extending arm 31, but it also includes an integral rearwardly extending arm 46 which terminates in a transverse portion 47. On both ends of this transverse portion are rearwardly turned ears forming crystal grippers 48 and 49. Interposed between the crystal grippers 48 and 49 and the crystal unit 23 is a suitable damping pad 50 made of soft rubber or the like.

During operation of the Figs. 1–4 embodiment the laterally cut sound track or groove of the phonograph record sound disc causes the stylus arm 22 to vibrate through small angles relative to the longitudinal axis of the coupler 28, and these vibrations are transmitted to the crystal unit 23, causing it to vibrate torsionally in accordance with the vibrations of the stylus. The piezoelectric characteristics of the unit 23 cause a corresponding alternating voltage signal to be developed between the terminals 33 and 34, which signal is then employed, after appropriate amplification, to actuate suitable apparatus for converting audio-frequency signals into sound.

The coupler 28 is of stiff material and mounted between elastic pads 29, 30, whereby it is able to turn in compliance with the vibrations of the stylus 22. Additionally, the elastic character of the damping pads 29, 30, and the absence of bearings and trunnions between stud 27 and crystal 23, permit a lateral movement of the middle portion of the junction of the crystal and coupler 28 in the plane of crystal 23, whereby the high frequency vibrations are accentuated and discrimination against noise is increased.

Reference to Fig. 6 shows one important result which is obtained by the cantilever-mounted coupler and the absence of bearings and trunnions. One successful commercial embodiment of the present invention in accordance with Figs. 1–4, a standard record disc being used, manifests a flat frequency characteristic throughout the range beginning with the lowest audio-frequency notes and ending in the vicinity of 2000 cycles. Near this point there is a slight rise in power output response as frequency increases, whereby the brilliance of the sound is maintained to the end of the range. Above 2000 cycles the characteristic curve falls off very rapidly, so that there is a more sharp discrimination against high frequency noise than in the case of prior art devices, where the characteristic curve begins its downward slope at a considerably lower frequency.

Although I do not wish to be limited to any specific theory of operation of the invention, I believe that this desired performance characteristic is attained by reason of the absence of any trunnion or bearing between stud 27 and the crystal, and the mounting of coupler 28 in such a way, as a cantilever, that its mid-portion has a measure of freedom to move laterally.

An alternative embodiment of the invention is illustrated in Figs. 7–17, distinguishing from the Fig. 1–4 embodiment primarily in the configuration of the coupler member. Like reference numerals are employed herein to designate elements which are common to both embodiments, in order that further description of those elements may be dispensed with.

Reference is first made to Figs. 15–17, relating to the coupler member of the Fig. 7 embodiment, which member is mounted as a cantilever to transmit motion from the stylus to the crystal. This one-piece coupler comprises a central portion 52 and an integral front portion 53, adapted to be clamped between pads 29, 30 to mount the tongue as a cantilever. Portions 52 and 53 are offset, as shown at 54. Rearwardly of the central portion 52 is a downwardly turned section 55 which terminates in a rearwardly turned spring-holding section 56, to which the spring 26 is secured as by eyelets 57 and 58. On each side of the downwardly turned section 55 are wings 59, 60, which terminate in integral crystal unit grippers 49 and 48. Each of the crystal grippers comprises upper and lower rearwardy turned ears on the wings.

The Fig. 7 casing comprises two metallic members, an upper member 60 and a lower member 61, the upper member being set into ledges 63 and 64 on the lower member and secured to upstanding bosses 65 and 66, formed in the lower member, as by screws 67 and 68. The remaining details of the Fig. 7 embodiment are not of significance so far as the present invention is concerned, and it is not necessary further to describe them other than to mention the opening 90 provided in the lower member for permitting free action of the spring 26. The invention relates to the combination of a coupler having a crystal clamp 48—49 at one end and a depending stylus holder 26 for transmitting motion from the stylus to the piezoelectric unit 23 in conformity to the vibrations of a record, and means comprising the acoustic damping pads 29, 30 for clamping the other end 53 of the coupler in such a manner as to permit not only turning movement of the tongue, but also elastically restrained lateral movement of the coupler-crystal junction.

Referring now specifically to the embodiment of the invention illustrated in Fig. 18, it will be seen to include the usual upper and lower casing members 80 and 81, a torsion-type crystal unit 23, damping material 24, 25 for supporting the crystal at the rear of the casing, a stylus 22, needle 26, a damping pad 29, and a coupler. The coupler in this particular embodiment comprises a rearwardly extending pair of integral crystal clamping elements, one pair of which is shown at 82, and a central rearwardly extending member 83 which is relatively long and supports the whole tongue as a cantilever, being secured to top member 80. The coupler also includes a downwardly extending portion 84 to which the spring 26 is secured. This embodiment also features a cantilever mounting serving as the sole support of the vibration-translating coupling between the crystal and the stylus.

While there have been shown and described what are at present considered to be the preferred embodiments of the invention, it will be obvious to those skilled in the art that various changes and modifications may be made therein without departing from the invention as defined by the appended claims.

Having fully disclosed and described my invention, I claim:

1. In a phonograph pickup of the type comprising a casing and a torsion-type piezoelectric crystal and a stylus mounted for vertical compliance in a plane normal to the central plane of the crystal, the combination of the following: a member for transmitting motion from said stylus to said crystal, said member having a flat integral front portion and said stylus being coupled to said member intermediate the ends thereof, means for clamping the rear end of said member to the front end of said crystal, and clamping means comprising a pair of pads disposed in the casing above and below said front portion and beyond the point of coupling of said member to said stylus for completing the support of said member, both of said clamping means acting in a direction normal to the plane of the crystal thereby to permit restrained lateral movement of the junction of said member and said crystal in the plane of said crystal.

2. In a phonograph pickup of the type comprising a casing and a torsional type piezoelectric crystal and a stylus mounted for vertical compliance in a plane normal to the central plane of the crystal, the combination of the following: a T-shaped member having an integral leg and arms for transmitting motion from said stylus to said crystal, said stylus being coupled to the leg of said member intermediate the ends thereof, means including integral rearwardly extending tongues on said member for clamping the rear arm of said member to the front end of said crystal, and clamping means including a pair of clamping pads disposed in the casing adjacent the front arm of said member and entirely beyond its point of connection to said stylus for completing the support of said member, both of said clamping means acting in a direction normal to the plane of the crystal thereby to permit restrained lateral movement of the junction of said member and said crystal in the plane of said crystal, said front arm being clamped between said pads.

CHARLES E. KILGOUR.

REFERENCES CITED

The following references are of record in the file of this patent:

UNITED STATES PATENTS

| Number | Name | Date |
|---|---|---|
| 1,884,547 | Bower | Oct. 25, 1932 |
| 1,900,038 | Bower | Mar. 7, 1933 |
| 2,313,129 | Dohan | Mar. 9, 1943 |
| 2,328,952 | Burt | Sept. 7, 1943 |